United States Patent [19]
Hayashi et al.

[11] Patent Number: 5,128,446
[45] Date of Patent: Jul. 7, 1992

[54] PROCESS FOR PRODUCING CYCLOOLEFIN RANDOM COPOLYMER

[75] Inventors: Takashi Hayashi; Shunyo Uesugi; Hiroo Wamura, all of Kuga, Japan

[73] Assignee: Mitsui Petrochemical Industries, Ltd., Tokyo, Japan

[21] Appl. No.: 403,459

[22] Filed: Sep. 6, 1989

[30] Foreign Application Priority Data

Sep. 7, 1988 [JP] Japan ................. 63-223775
Sep. 7, 1988 [JP] Japan ................. 63-223776

[51] Int. Cl.$^5$ .................. C08F 6/10; C08F 6/12
[52] U.S. Cl. .................. 528/501; 526/281; 525/197; 525/198; 525/210
[58] Field of Search .................. 528/501

[56] References Cited

U.S. PATENT DOCUMENTS

| | | | |
|---|---|---|---|
| 3,280,091 | 10/1966 | Dance | 528/501 |
| 3,494,897 | 2/1970 | Reding et al. | 526/229 |
| 3,523,929 | 8/1970 | Paige et al. | 528/501 |
| 4,332,933 | 6/1982 | Di Drusco et al. | 528/501 |
| 4,424,341 | 1/1984 | Hanson et al. | 528/501 |
| 4,439,601 | 3/1984 | Mc Curdy et al. | 528/501 |
| 4,874,808 | 10/1989 | Minami et al. | 525/210 |

FOREIGN PATENT DOCUMENTS

| | | |
|---|---|---|
| 0156464 | 10/1985 | European Pat. Off. |
| 0203799 | 12/1986 | European Pat. Off. |
| 0235421 | 9/1987 | European Pat. Off. |
| 4539101 | 12/1970 | Japan |

*Primary Examiner*—Carman J. Seccuro
*Attorney, Agent, or Firm*—Sherman and Shalloway

[57] ABSTRACT

Disclosed herein is a process for the production of cycloolefin random copolymers comprising flash drying a solution of a cylcoolefin random copolymer in a hydrocarbon, said solution being obtained by copolymerization of ethylene and a specific cycloolefin in said hydrocarbon in the prsence of a catalyst. Further proposed herein is a process for the production of cycloolefin random copolymers by copolymerization of ethylene with a specific cycloolefin of the in a hydrocarbon in the presence of a catalyst wherein said copolymerization is carried out in a polymerization reactor where a gas phase is not substantially present.

1 Claim, No Drawings

PROCESS FOR PRODUCING CYCLOOLEFIN RANDOM COPOLYMER

FIELD OF THE INVENTION

The invention relates to a process for the production of cycloolefin random copolymers. More particularly, it relates to a process for the production of cycloolefin random copolymers which are excellent in heat resistance, heat aging property, chemical resistance, solvent resistance, dielectric property, rigidity as well as impact property.

BACKGROUND OF THE INVENTION

It has been recently found that random copolymers of ethylene and specific bulky cycloolefins are excellent in transparency and have balanced heat resistance, heat ageing property, chemical resistance, solvent resistance, dielectric characteristics and mechanical properties, and such random copolymers was proposed in U.S. Pat. No. 4,614,778 and Japanese patent Laid-open Publication No. 61-98,780 (1984). While the random copolymers proposed have excellent properties as described above, they are likely to contain an amount of unreacted cycloolefin monomer, which impair the quality of the products. Japanese Patent Laid-open Publication No. 62-215,611 discloses a process for removing the unreacted cycloolefin monomer from the ethylene-cycloolefin random copolymers.

By the process disclosed in Japanese Patent Laid-open Publication No. 62-215,611, there can be obtained cycloolefin random copolymers of high quality which are suitable for use in optical materials, in particular optical memory discs. This process is, however, complicated, and is hardly productive of a purified product of a uniform quality unless the starting copolymer have a molecular weight within a certain limited range.

Because of their excellent properties ethylene-cycloolefin random copolymers find their application in various other fields, and thus, desired in the art is a process for removing unreacted cycloolefin monomer from ethylene-cycloolefin random copolymers having a molecular weight within a wide range.

Further, the inventors have found some problems that upon continuous copolymerization of ethylene with a bulky cycloolefin in a polymerization vessel equipped with a stirrer, although depending upon the reaction conditions, undesirable copolymers which have unduly high content of ethylene and are insoluble in a hydrocarbon solvent used in the polymerization reaction (referred to hereinafter as solvent-insoluble copolymers) are liable to be formed on the wall of the polymerization vessel in the vicinity of the gas-liquid interface in the vessel, that the solvent-insoluble copolymers formed on the wall of the vessel in the vicinity of the gas-liquid interface invite changes in conditions of the gas-liquid interface with time and, when formed in large amounts, result in decrease of the effective area of the gas-liquid interface, that on that account the copolymerization of ethylene and the cycloolefin does not proceed sufficiently, and that the solvent-insoluble copolymers formed on the wall of the vessel fall off in the liquid phase in the vessel, withdrawn through a pick up line together with the desired copolymer produced, and trapped by a filtering device installed in the pick up line to clog the filtering device and occasionally the pick up line in itself, thereby hindering a continuous and stable running of a series of apparatus for the production of the ethylene-cycloolefin random copolymers including the filtering device.

OBJECT OF THE INVENTION

The invention intends to solve the above discussed problems, and an object of the invention is to provide a process for the production of cycloolefin random copolymers, which process comprises simple steps and is capable of economically producing cycloolefin random copolymers of high quality with any unreacted cycloolefin monomer substantially removed and having excellent heat resistance, heat aging property, chemical resistance, solvent resistance, dielectric property, rigidity as well as impact property.

Another object of the invention is to provide a process for the production of cycloolefin random copolymers by copolymerizing ethylene with a cycloolefin in a polymerization reactor, which process is capable of ensuring a smooth copolymerization of ethylene and the cycloolefin and maintaining a continuous and stable running of the apparatus for the production of ethylene-cycloolefin random copolymers for a prolonged period of time, and which is productive of ethylene-cycloolefin random copolymers which have uniform quality and are excellent in heat resistance, heat aging property and various mechanical properties.

SUMMARY OF THE INVENTION

A first process for the production of cycloolefin random copolymers according to the invention comprises flash drying a solution of a cylcoolefin random copolymer in a hydrocarbon, said solution being obtained by copolymerization of ethylene and a cycloolefin of the general formula [I] noted below in said hydocarbon in the presence of a catalyst.

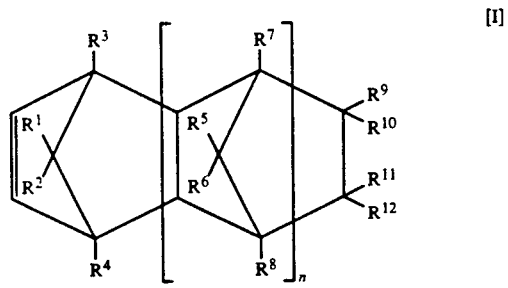

[I]

wherein n is 0 or a positive integer, and $R^1$ to $R^{12}$ are the same or different, and each represents a hydrogen or halogen atom or a hydrocarbon group, or $R^9$ (or $R^{10}$) and $R^{11}$ (or $R^{12}$), when taken together, may form a mono- or poly-cyclic ring.

A second process for the production of cycloolefin random copolymers according to the invention comprises admixing a first solution of a first cycloolefin random copolymer [B] in a first hydrocarbon and a second solution of a second random copolymer [C] in a second hydrocarbon to provide a mixed solution in which from 5 to 100 parts by weight of said second cycloolefin random copolymer [C] is present based on 100 parts by weight of said first cycloolefin random copolymer [B] present therein, said first solution being obtained by copolymerization of ethylene and a cycloolefin of the general formula [I] noted below in said first hydocarbon in the presence of a catalyst, said first cycloolefin random copolymer [B] having an intrinsic viscosity [η] of from 0.05 to 10 dl/g measured in decalin at 135° C. and a softening point (TMA) of at least 70° C., said second solution being obtained by copolymerization of ethylene, at least one α-olefin other than ethylene and a cycloolefin of the general formula [I] noted below in said second hydocarbon in the presence of a catalyst, said second cycloolefin random copolymer [C] having an intrinsic viscosity [η] of from 0.01 to 10 dl/g measured in decalin at 135° C. and a softening point (TMA) of less than 70° C.; and flash drying said mixed solution.

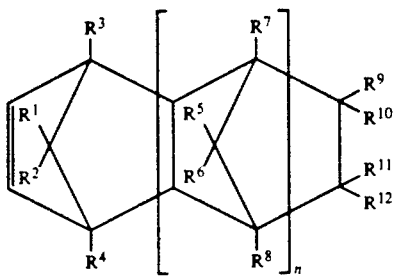

[I]

wherein n is 0 or a positive integer, and $R^1$ to $R^{12}$ are the same or different, and each represents a hydrogen or halogen atom or a hydrocarbon group, or $R^9$ (or $R^{10}$) and $R^{11}$ (or $R^{12}$), when taken together, may form a mono- or poly-cyclic ring.

A third process for the production of cycloolefin random copolymers according to the invention comprises admixing a first solution of a first cycloolefin random copolymer [B] in a first hydrocarbon and a third solution of a third random copolymer [D] in a third hydrocarbon to provide a mixed solution in which from 5 to 100 parts by weight of said third cycloolefin random copolymer [D] is present based on 100 parts by weight of said first cycloolefin random copolymer [B] present therein, said first solution being obtained by copolymerization of ethylene and a cycloolefin of the general formula [I] noted below in said first hydocarbon in the presence of a catalyst, said first cycloolefin random copolymer [B] having an intrinsic viscosity [η] of from 0.05 to 10 dl/g measured in decalin at 135° C. and a softening point (TMA) of at least 70° C., said third solution being obtained by copolymerization of ethylene, at least one of propylene and butene and a cycloolefin of the general formula [I] noted below in said third hydocarbon in the presence of a catalyst, said third cycloolefin random copolymer [C] having an intrinsic viscosity [η] of from 0.01 to 10 dl/g measured in decalin at 135° C. and a softening point (TMA) of less than 70° C.; and flash drying said mixed solution.

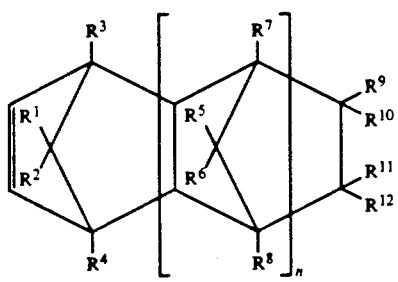

[I]

wherein n is 0 or a positive integer, and $R^1$ to $R^{12}$ are the same or different, and each represents a hydrogen or halogen atom or a hydrocarbon group, or $R^9$ (or $R^{10}$) and $R^{11}$ (or $R^{12}$), when taken together, may form a mono- or poly-cyclic ring.

By the first, second and third processes according to the invention in which a solution of cylcoolefin random copolymer(s) in a hydrocarbon is flash dried, there can be economically and effectively produced cycloolefin random copolymer(s) of high quality having any unreacted cycloolefin monomer substantially removed with no need of any complicated process steps.

A fourth process for the production of cycloolefin random copolymers according to the invention comprises copolymerization of ethylene with a cycloolefin of the general formula [I] noted below in a hydrocarbon in the presence of a catalyst wherein said copolymerization is carried out in a polymerization reactor where a gas phase is not substantially present.

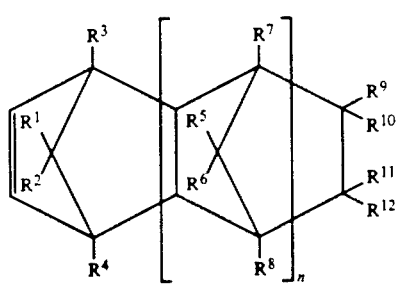

[I]

wherein n is 0 or a positive integer, and $R^1$ to $R^{12}$ are the same or different, and each represents a hydrogen or halogen atom or a hydrocarbon group, or $R^9$ (or $R^{10}$) and $R^{11}$ (or $R^{12}$), when taken together, may form a mono- or poly-cyclic ring.

The fourth process for the production of cycloolefin random copolymers according to the invention, in which ethylene is copolymerized with the cycloolefin in a polymerization reactor where a gas phase is not substantially present, ensures a smooth copolymerization of ethylene and the cycloolefin and a continuous and stable running of the apparatus for the production of ethylene-cycloolefin random copolymers, and is productive of ethylene-cycloolefin random copolymers which have a uniform quality and are excellent in heat resistance, heat aging property and various mechanical properties.

DETAILED DESCRIPTION OF THE INVENTION

The processes according to the invention will now be illustrated in detail.

First, the steps of the first process for the production of cycloolefin random copolymers according to the invention will be specifically described in sequence.

CYCLOOLEFIN MONOMERS

In the first process according to the invention, at least one cycloolefin of the general formula [I] noted below is copolymerized with ethylene.

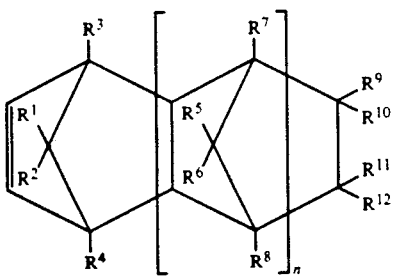

[I]

In the general formula [I], n is 0 or a positive integer, and $R^1$ to $R^{12}$ are the same or different, and each represents a hydrogen or halogen atom or a hydrocarbon group, or $R^9$ (or $R^{10}$) and $R^{11}$ (or $R^{12}$), when taken together, may form a mono- or poly-cyclic ring.

The cycloolefins represented by the general formula [I] can be easily prepared by condensation of cyclopentadienes with appropriate olefins by Diels-Alder reaction.

Examples of the cycloolefins represented by the general formula [I] include such compounds as exemplified in Table 1, and in addition to 1,4,5,8-dimethano-1,2,3,4,4a,5,8,8a-octahydronaphthalene, such octahydronaphthalenes as 2-methyl-1,4,5,8-dimethano-1,2,3,4,4a,5,8,8a-octahydronaphthalene, 2-ethyl-1,4,5,8-dimethano-1,2,3,4,4a,5,8,8a-octahydronaphthalene, 2-propyl-1,4,5,8-dimethano-1,2,3,4,4a,5,8,8a-octahydronaphthalene, 2-hexyl-1,4,5,8-dimethano-1,2,3,4,4a,5,8,8a-octahydronaphthalene, 2-stearyl-1,4,5,8-dimethano-1,2,3,4,4a,5,8,8a-octahydronaphthalene, 2,3-dimethyl-1,4,5,8-dimethano-1,2,3,4,4a,5,8,8a-octahydronaphthalene, 2-methyl-3-ethyl-1,4,5,8-dimethano-1,2,3,4,4a,5,8,8a-octahydronaphthalene, 2-chloro-1,4,5,8-dimethano-1,2,3,4,4a,5,8,8a-octahydronaphthalene, 2-bromo-1,4,5,8-dimethano-1,2,3,4,4a,5,8,8a-octahydronaphthalene, 2-fluoro-1,4,5,8-dimethano-1,2,3,4,4a,5,8,8a-octahydronaphthalene, 2,3-dichloro-1,4,5,8-dimethano-1,2,3,4,4a,5,8,8a-octahydronaphthalene, 2-cyclohexyl-1,4,5,8-dimethano-1,2,3,4,4a,5,8,8a-octahydronaphthalene, 2-n-butyl-1,4,5,8-dimethano-1,2,3,4,4a,5,8,8a-octahydronaphthalene and 2-isobutyl-1,4,5,8-dimethano-1,2,3,4,4a,5,8,8a-octahydronaphthalene.

| Chemical formula | Compound name |
|---|---|
|  | Bicyclo[2,2,1]hept-2-ene |
|  | 6-Methylbicyclo[2,2,1]hept-ene |
|  | 5,6-Dimethylbicyclo[2,2,1]hept-2-ene |
|  | 1-Methylbicyclo[2,2,1]hept-2-ene |
|  | 6-Ethylbicyclo[2,2,1]hept-2-ene |
|  | 6-Butylbicyclo[2,2,1]hept-2-ene |
|  | 6-Isobutylbicyclo[2,2,1]hept-2-ene |
|  | 7-Methylbicyclo[2,2,1]hept-2-ene |

| Chemical formula | Compound name |
|---|---|
| | Tetracyclo[4,4,0,1$^{2,5}$,1$^{7,10}$]-3-dodecene |
| CH$_3$ | 8-Methyltetracyclo[4,4,0, 1$^{2,5}$,1$^{7,10}$]-3-dodecene |
| C$_2$H$_5$ | 8-Ethyltetracyclo[4,4,0, 1$^{2,5}$,1$^{7,10}$]-3-dodecene |
| C$_3$H$_7$ | 8-Propyltetracyclo[4,4,0, 1$^{2,5}$,1$^{7,10}$]-3-dodecene |
| C$_6$H$_{13}$ | 8-Hexyltetracyclo[4,4,0, 1$^{2,5}$,1$^{7,10}$]-3-dodecene |
| C$_{18}$H$_{37}$ | 8-Stearyltetracyclo[4,4,0, 1$^{2,5}$,1$^{7,10}$]-3-dodecene |
| CH$_3$, CH$_3$ | 8,9-Dimethyltetracyclo[4,4,0, 1$^{2,5}$,1$^{7,10}$]-3-dodecene |
| CH$_3$, C$_2$H$_5$ | 8-Methyl-9-ethyltetracyclo[4,4,0, 1$^{2,5}$,1$^{7,10}$]-3-dodecene |
| Cl | 8-Chlorotetracyclo[4,4,0, 1$^{2,5}$,1$^{7,10}$]-3-dodecene |
| Br | 8-Bromotetracyclo[4,4,0, 1$^{2,5}$,1$^{7,10}$]-3-dodecene |
| F | 8-Fluorotetracyclo[4,4,0, 1$^{2,5}$1$^{7,10}$]-3-dodecene |
| Cl, Cl | 8,9-Dichlorotetracyclo[4,4,0, 1$^{2,5}$,1$^{7,10}$]-3-dodecene |
| | 8-Cyclohexyltetracyclo[4,4,0, 1$^{2,5}$,1$^{7,10}$]-3-dodecene |

-continued

| Chemical formula | Compound name |
|---|---|
| 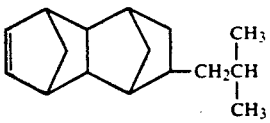 | 8-Isobutyltetracyclo[4.4.0.1$^{2.5}$,1$^{7.10}$]-3-dodecene |
| 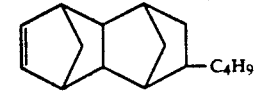 | 8-Butyltetracyclo[4.4.0.1$^{2.5}$,1$^{7.10}$]-3-dodecene |
| 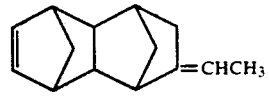 | 8-Ethylidenetetracyclo[4.4.0.1$^{2.5}$,1$^{7.10}$]-3-dodecene |
| 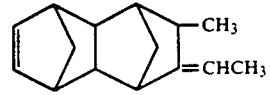 | 8-Ethylidene-9-methyltetracyclo[4.4.0.1$^{2.5}$,1$^{7.10}$]-3-dodecene |
| 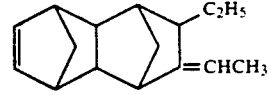 | 8-Ethylidene-9-ethyltetracyclo[4.4.0.1$^{2.5}$,1$^{7.10}$]-3-dodecene |
| 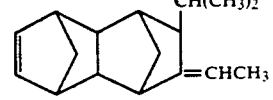 | 8-Ethylidene-9-isopropyltetracyclo[4.4.0.1$^{2.5}$,1$^{7.10}$]-3-dodecene |
| 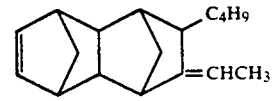 | 8-Ethylidene-9-butyltetracyclo[4.4.0.1$^{2.5}$,1$^{7.10}$]-3-dodecene |
| 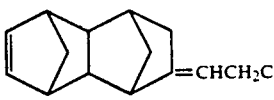 | 8-n-Propylidenetetracyclo[4.4.0.1$^{2.5}$,1$^{7.10}$]-3-dodecene |
| 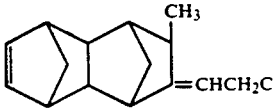 | 8-n-Propylidene-9-methyltetracyclo[4.4.0.1$^{2.5}$,1$^{7.10}$]-3-dodecene |
| 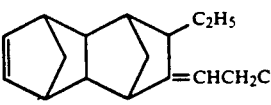 | 8-n-Propylidene-9-ethyltetracyclo[4.4.0.1$^{2.5}$,1$^{7.10}$]-3-dodecene |
| 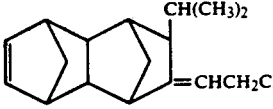 | 8-n-Propylidene-9-isopropyltetracyclo[4.4.0.1$^{2.5}$,1$^{7.10}$]-3-dodecene |
| 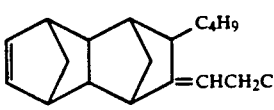 | 8-n-Propylidene-9-butyltetracyclo[4.4.0.1$^{2.5}$,1$^{7.10}$]-3-dodecene |
| 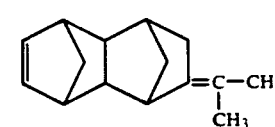 | 8-Isopropylidenetetracyclo[4.4.0.1$^{2.5}$,1$^{7.10}$]-3-dodecene |

| Chemical formula | Compound name |
|---|---|
| | 8-Isopropylidene-9-methyltetracyclo[4,4,0,1$^{2.5}$,1$^{7.10}$]-3-dodecene |
| | 8-Isopropylidene-9-ethyltetracyclo[4,4,0,1$^{2.5}$,1$^{7.10}$]-3-dodecene |
| | 8-Isopropylidene-9-isopropyltetracyclo[4,4,0,1$^{2.5}$,1$^{7.10}$]-3-dodecene |
| | 8-Isopropylidene-9-butyltetracyclo[4,4,0,1$^{2.5}$,1$^{7.10}$]-3-dodecene |
| | 5,10-Dimethyltetracyclo[4,4,0,1$^{2.5}$,1$^{7.10}$]-3-dodecene |
| | 2,10-Dimethyltetracyclo-[4,4,0,1$^{2.5}$,1$^{7.10}$]-3-dodecene |
| | 11,12-Dimethyltetracyclo-[4,4,0,1$^{2.5}$,1$^{7.10}$]-3-dodecene |
| | 2,7,9-Trimethyltetracyclo-[4,4,0,1$^{2.5}$,1$^{7.10}$]-3-dodecene |
| | 9-Ethyl-2,7-dimethyltetracyclo-[4,4,0,1$^{2.5}$,1$^{7.10}$]-3-dodecene |
| | 9-Isobutyl-2,7-dimethyltetracyclo-[4,4,0,1$^{2.5}$,1$^{7.10}$]-3-dodecene |

| Chemical formula | Compound name |
|---|---|
| | 9,11,12-Trimethyltetracyclo-[4,4,0,1$^{2.5}$,1$^{7.10}$]-3-dodecene |
| | 9-Ethyl-11,12-dimethyltetracyclo-[4,4,0,1$^{2.5}$,1$^{7.10}$]-3-dodecene |
| | 9-Isobutyl-11,12-dimethyltetracyclo-[4,4,0,1$^{2.5}$,1$^{7.10}$]-3-dodecene |
| | 5,8,9,10-Tetramethyltetracyclo-[4,4,0,1$^{2.5}$,1$^{7.10}$]-3-dodecene |
| | Hexacyclo[6,6,1,1$^{3.6}$,1$^{10.13}$,0$^{2.7}$,0$^{9.14}$]-4-heptadecene |
| | 12-Methylhexacyclo[6,6,1,1$^{3.6}$, 1$^{10.13}$,0$^{2.7}$,0$^{9.14}$]-4-heptadecene |
| | 12-Ethylhexacyclo[6,6,1,1$^{3.6}$, 1$^{10.13}$,0$^{2.7}$,0$^{9.14}$]-4-heptadecene |
| | 12-Isobutylhexacyclo[6,6,1,1$^{3.6}$, 1$^{10.13}$,0$^{2.7}$,0$^{9.14}$]-4-heptadecene |
| | 1,6,10-Trimethyl-12-isobutyl-hexacyclo[6,6,1,1$^{3.6}$,1$^{10.13}$,0$^{2.7}$,0$^{9.14}$]-4-heptadecene |
| | Octacyclo[8,8,0,1$^{2.9}$,1$^{4.7}$,1,1$^{11.18}$, 1$^{13.16}$,0$^{3.8}$,0$^{12.17}$]-5-docosen |
| | 15-Methyloctacyclo[8,8,0,1$^{2.9}$,1$^{4.7}$, 1,1$^{11.18}$,1$^{13.16}$,0$^{3.8}$,0$^{12.17}$]-5-docosen |

-continued

| Chemical formula | Compound name |
|---|---|
| 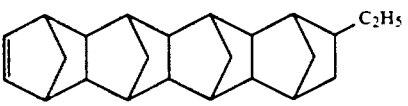 | 15-Ethyloctacyclo[8.8.0.1$^{2.9}$,1$^{4.7}$, 1$^{11.18}$,1$^{13.16}$,0$^{3.8}$,0$^{12.17}$]-5-docosen |
| 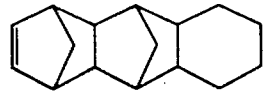 | Pentacyclo[6.6.1.1$^{3.6}$,0$^{2.7}$,0$^{9.14}$]-4-hexadecene |
| 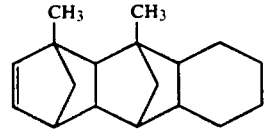 | 1,3-Dimethylpentacyclo[6.6.1, 1$^{3.6}$,0$^{2.7}$,0$^{9.14}$]-4-hexadecene |
| 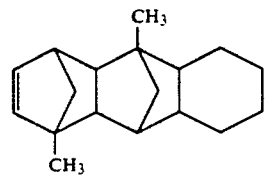 | 1,6-Dimethylpentacyclo[6.6.1, 1$^{3.6}$,0$^{2.7}$,0$^{9.14}$]-4-hexadecene |
| 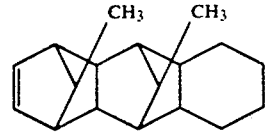 | 15,16-Dimethylpentacyclo[6.6.1, 1$^{3.6}$,0$^{2.7}$,0$^{9.14}$]-4-hexadecene |
| 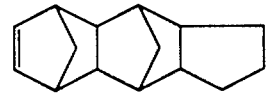 | Pentacyclo[6.5.1.1$^{3.6}$, 0$^{2.7}$,0$^{9.13}$]-4-pentadecene |
| 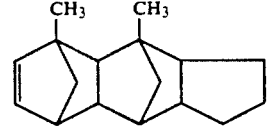 | 1,3-Dimethylpentacyclo[6.5.1.1$^{3.6}$, 0$^{2.7}$,0$^{9.13}$]-4-pentadecene |
| 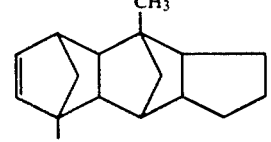 | 1,6-Dimethylpentacyclo[6.5.1.1$^{3.6}$, 0$^{2.7}$,0$^{9.13}$]-4-pentadecene |
| 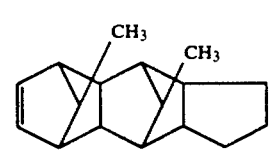 | 14,15-Dimethylpentacyclo[6.5.1.1$^{3.6}$, 0$^{2.7}$,0$^{9.13}$]-4-pentadecene |
| 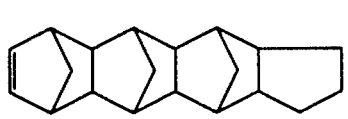 | Heptacyclo[8.7.0.1$^{2.9}$,1$^{4.7}$,1$^{11.17}$, 0$^{3.8}$,0$^{12.16}$]-5-icosene |
| 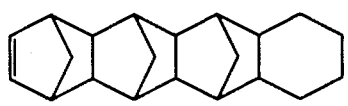 | Heptacyclo[8.8.0.1$^{2.9}$,1$^{4.7}$,1$^{11.18}$, 0$^{3.8}$,0$^{12.17}$]-5-icosene |

-continued

| Chemical formula | Compound name |
|---|---|
| 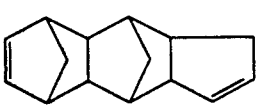 | Pentacyclo[6,5,1,1$^{3,6}$, 0$^{2,7}$,0$^{9,13}$]-4,10-pentadecadiene |
| 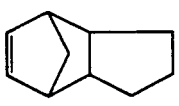 | Tricyclo[4,3,0,1$^{2,5}$]-3-decene |
| 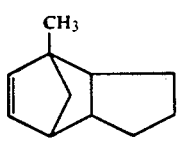 | 2-Methyl-tricyclo[4,3,0,1$^{2,5}$]-3-decene |
| 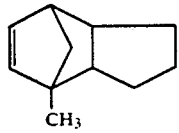 | 5-Methyl-tricyclo[4,3,0,1$^{2,5}$]-3-decene |
| 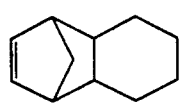 | Tricyclo[4,4,0,1$^{2,5}$]-3-undecene |
| 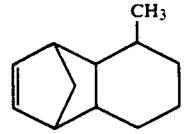 | 10-Methyl-tricyclo[4,4,0,1$^{2,5}$]-3-undecene |
| 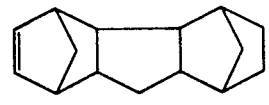 | Pentacyclo[4,7,0,1$^{2,5}$,0$^{8,13}$,1$^{9,12}$]-3-pentadecene |
| 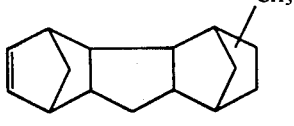 | Methyl-substituted pentacyclo [4,7,0,1$^{2,5}$,0$^{8,13}$,1$^{9,12}$]-3-pentadecene |
| 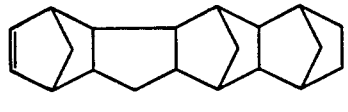 | Heptacyclo[7,8,0,1$^{3,6}$,0$^{2,7}$,1$^{10,17}$, 0$^{11,16}$,1$^{12,15}$]-4-icosene |
| 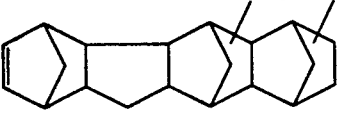 | Dimethyl-substituted heptacyclo [7,8,0,1$^{3,6}$,0$^{2,7}$,1$^{10,17}$,0$^{11,16}$,1$^{12,15}$]-4-icosene |
| 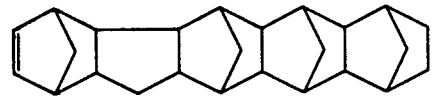 | Nonacyclo[9,10,1,1$^{4,7}$,0$^{3,8}$,0$^{2,10}$,0$^{12,21}$, 1$^{13,20}$,0$^{14,19}$,1$^{15,18}$]-5-pentacosene |

-continued

| Chemical formula | Compound name |
|---|---|
| 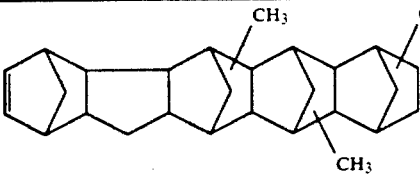 | Trimethyl-substituted nonacyclo [9,10,1,1$^{4,7}$,0$^{3,8}$,0$^{2,10}$,0$^{12,21}$,1$^{13,20}$, 0$^{14,19}$,1$^{15,18}$]-5-pentacosene |

In the process according to the invention, ethylene is copolymerized with at least one cycloolefin of the general formula [I]. In addition to said two essential components, however, there may be optionally copolymerized other copolymerizable unsaturated monomers in such a range that they do not mar the object of the invention. Examples of the unsaturated monomers which may optionally be copolymerized ethylene and at least one cycloolefin of the general formula [I], include α-olefins having from 3 to 20 carbon atoms, such as propylene, 1-butene, 4-methyl-1-pentene, 1-hexene, 1-octene, 1-decene, 1-dodecene, 1-tetradecene, 1-hexadecene, 1-octadecene and 1-icosene, in such a proportion that the resulting cycloolefin random copolymer may contain units derived therefrom in an amount less than an equimolar amount of units derived from ethylene; cycloolefins, such as cyclopentene, cyclohexene, 3-methylcyclohexene, cyclooctene and 3a, 5, 6, 7a-tetrahydro-4, 7-methano-1H-indene of the formula:

in such a proportion that the resulting cycloolefin random copolymer may contain units derived therefrom in an amount less than an equimolar amount of units derived from the cycloolefin of the general formula [I]; non-conjugated dienes, such as 1,4-hexadiene, 4-methyl-1,4-hexadiene, 5-methyl-1,4-hexadiene. 1,7-octadiene, dicyclopentadiene, 5-ethylydene-2-norbornene and 5-vinyl-2-norbornene, in such a proportion that the resulting cycloolefin random copolymer may contain units derived therefrom in an amount less than an equimolar amount of units derived from the cycloolefin of the general formula [I]; and norbornene compounds, such as norbornene-2, 5-methylnorbornene-2, 5-ethylnorbornene-2, 5-isopropylnorbornene-2, 5-n-butylnorbornene-2, 5-i-butylnorbornene-2, 5,6-dimethylnorbornene-2, 5-chloronorbornene-2, 2-fluoronorbornene-2 and 5,6-dichloronorbornene-2, in such a proportion that the resulting cycloolefin random copolymer may contain units derived therefrom in an amount less than an equimolar amount of units derived from the cycloolefin of the general formula [I].

SOLVENTS

In the process according to the invention, ethylene is copolymerized with at least one cycloolefin of the general formula [I] in a hydrocarbon solvent. The hydrocarbon solvents herein include aliphatic hydrocarbons such as hexane, heptane, octane, and kerosene; alicyclic hydrocarbons such as cyclohexane and methylcyclohexane; aromatic hydrocarbons such as benzene, toluene and xylene; and the above-illustrated cycloolefins of the general formula [I], alone or in combination.

CATALYSTS

In the process according to the invention, ethylene is copolymerized with at least one cycloolefin of the general formula [I] in the presence of a catalyst. Suitable catalysts which can be used herein comprise a vanadium compound which is soluble in the particular hydrocarbon solvent used and an organoaluminum compound.

The vanadium compounds as one component of the catalyst, include compounds of the general formula $VO(OR)_aX_b$ or $V(OR)_cX_d$ wherein R is a hydrocarbon group and a, b, c and d are numbers satisfying $0 \leq a \leq 3$, $0 \leq b \leq 3$, $2 \leq a+b \leq 3$, $0 \leq c \leq 4$, $0 \leq d \leq 4$, and $3 \leq c+d \leq 4$; and their adducts with an electron donor. Examples of the vanadium compound include, for example, $VO(Cl_3)$, $VO(OC_2H_5)Cl_2$, $VO(OC_2H_5)_2Cl$, $VO(O\text{-}iso\text{-}C_3H_7)Cl_2$, $VO(O\text{-}n\text{-}C_4H_9)Cl_2$, $VO(OC_2H_5)_3$, $VCl_4$, $VOCl_2$, $VOBr_2$, $VO(O\text{-}n\text{-}C_4H_9)_3$ and $VCl_3\cdot 20C_8H_{17}OH$.

Electron donors which can be used for the preparation of the vanadium component of the catalyst may be oxygen-containing electron donors such as alcohols, phenols, ketones, aldehydes, carboxylic acids, esters of organic and inorganic acids, ethers, acid amides, acid anhydrides and alkoxysilanes; or nitrogen-containing electron donors such as ammonia, amines, nitriles and isocyanates. Examples of suitable electron donors include, for example, alcohols having from 1 to 18 carbon atoms, such as methanol, ethanol, propanol, isopropanol, pentanol, hexanol, octanol, dodecanol, octadecyl alcohol, oleyl alcohol, benzyl alcohol, phenylethyl alcohol, isopropylbenzyl alcohol and cumyl alcohol; phenols having from 6 to 20 carbon atoms which may include a lower alkyl group or groups attached to the aromatic ring, such as phenol, cresols, xylenols, ethylphenols, propylphenols, nonylphenols, cumylphenols and naphthols; ketones having from 3 to 15 carbon atoms, such as acetone, methyl ethyl ketone, methyl isobutyl ketone, acetophenone, benzophenone and benzoquinone; aldehydes having from 2 to 15 carbon atoms, such as acetaldehyde, propionaldehyde, octylaldehyde, benzaldehyde, tolualdehydes and naphthoaldehydes; organic acid esters having from 2 to 30 carbon atoms, such as methyl formate, methyl acetate, ethyl acetate, vinyl acetate, propyl acetate, octyl acetate, cyclohexyl acetate, ethyl propionate, methyl butyrate, ethyl valerate, methyl chloroacetate, ethyl dichloroacetate, methyl methacrylate, ethyl crotonate, ethyl cyclohexanecarboxylate, methyl benzoate, ethyl benzoate, propyl benzoate, butyl benzoate, octyl benzoate, cyclohexyl benzoate, phenyl benzoate, benzyl benzoate, methyl toluylates, ethyl toluylates, amyl toluylates, ethyl ethylbenzoates, methyl anisates, n-butyl maleate, diisobutyl methyl malonate, di-n-hexyl cyclohexenecarboxylate, diethyl nadate, diisopropyl tetrahydrophthalate, diethyl phthalate, diisobutyl phthalate, di-n-butyl phthalate, di-2-ethylhexyl phthalate, γ-butyrolactone, δ-valerolactone, coumarin, phthalide and ethylene carbonate; acid halides having from 2 to 15 carbon atoms, such as acetyl chloride, benzoyl chloride, toluyl chloride and anisic acid chloride; ethers having from 2 to 20 carbon atoms, such as methyl ether, ethyl ether, isopropyl ether, butyl ether, amyl ether, tetrahydrofuran, anisole and diphenyl ether; acid amides such as acetamide, benzamide and toluamides; amines such as methyl amine, ethyl amine, diethyl amine, tributyl amine, piperidine, tribenzyl amine, aniline, pyridine, picolines and tetramethylenediamine; nitriles such as acetonitrile, benzonitrile and tolunitriles; and alkoxysilanes such as ethyl silicate and diphenylmethoxysilane. The illustrated electron donors may be used alone or in combination.

As the organoaluminum compound of the other component of the catalyst, compounds having at least one Al—C bond in the molecule can be used. One group of such organoaluminum compounds may be represented by the general formula (i)

$$R^1_m Al(OR^2)_n H_p X_q \quad \text{(i)}$$

wherein $R^1$ and $R^2$ are the same or different, and each represents a hydrocarbon group having normally from 1 to 15, preferably from 1 to 4 carbon atoms, X is halogen and m, n, p and q are numbers satisfying $0 \leq m \leq 3$; $0 \leq n < 3$; $0 \leq p < 3$; $0 \leq q < 3$; and $m+n+p+q=3$. Another group of such compounds are complex compounds of aluminum and a metal of Group I represented by the general formula (ii)

$$M^1 AlR^1_4 \quad \text{(ii)}$$

wherein $M^1$ is Li, Na or K, and $R^1$ is as defined above.

The organoaluminum compounds of the general formula (i) include those of the general formula $$R^1_m Al(OR^2)_{3-m}$$

wherein $R^1$ and $R^2$ are as defined above, and m is a number preferably satisfying $1.5 \leq m < 3$; those of the general formula $$R^1_m AlX_{3-m}$$

wherein $R^1$ and X are as defined above, and m is a number preferably satisfying $0 < m < 3$; those of the general formula $$R^1_m AlH_{3-m}$$

wherein $R^1$ is as defined above, and m is a number preferably satisfying $2 \leq m < 3$; and those of the general formula $$R^1_m Al(OR^2)_n X_q$$

wherein $R^1$, $R^2$ and X are as defined above, and m, n and q are numbers satisfying $0 < m \leq 3$, $0 \leq n < 3$, $0 \leq q < 3$ and $m+n+q=3$.

Examples of the organoaluminum compound of the general formula (i) include, for example, trialkylaluminums such as triethylaluminum, triisopropylaluminum and tributylaluminum; partly alkoxylated alkylaluminums including, in addition to dialkylaluminum alkoxides such as diethylaluminum ethoxide and dibutylaluminum butoxide, alkylaluminum sesquialkoxides such as ethylaluminum sesquiethoxide and butylaluminum sesquibutoxide, and those having such an average composition as, for example, $R^1_{2.5}Al(OR^2)_{0.5}$; partly halogenated alkylaluminum halides including dialkylaluminum halides such as diethylaluminum chloride, dibutylaluminum chloride and diethylaluminum bromide, alkylaluminum sesquihalides such as ethylaluminum sesquichloride, butylaluminum sesquichloride and ethylaluminum sesquibromide, and alkylaluminum dihalides such as ethylaluminum dichloride, propylaluminum dichloride and butylaluminum dibromide; partly hydrogenated alkylaluminums including dialkylaluminum hydrides such as diethylaluminum hydride and dibutylaluminum hydride and alkylaluminum dihydrides such as ethylaluminum dihydride and propylaluminum dihydride; and partly alkoxylated and halogenated alkylaluminums such as ethylaluminum ethoxychloride, butylaluminum butoxychloride and ethylaluminum ethoxybromide. Furthermore, organoaluminum compounds in which two aluminum atoms are attached to one and the same oxygen or nitrogen atom, such as $$(C_2H_5)_2Al\ O\ Al(C_2H_5)_2,$$
$$(C_4H_9)_2Al\ O\ Al(C_4H_9)_2 \text{ and}$$

$$(C_2H_5)_2Al\ \underset{\underset{C_6H_5}{|}}{N}\ Al(C_2H_5)_2,$$

may also be used as the organoaluminum component of the catalyst.

Examples of the organoaluminum compound of the general formula (ii) include, for example, $LiAl(C_2H_5)_4$ and $LiAl(C_7H_{15})_4$.

Particularly preferred organoaluminum compounds which can be used herein as the organoaluminum component of the catalyst, are dialkylaluminum halides and alkylaluminum dihalides and mixtures thereof.

In the process according to the invention, the copolymerization is carried out continuously as hereinafter described in detail, and both the catalyst components are normally respectively diluted with the hydrocarbon solvent described above and fed to the polymerization vessel. A concentration of the vanadium compound fed to the reaction system is normally not higher than 10 times, preferably from 1 to 7 times, more preferably from 1 to 5 times the concentration of the vanadium compound present in the reaction system. Whereas a concentration of the organoaluminum compound fed to the reaction system may be not higher than 50 times the concentration of the vanadium compound present in the reaction system.

The concentration of the vanadium compound present in the reaction system is normally from 0.01 to 5 gram atom of V/liter, preferably from 0.05 to 3 gram atom of V/liter, and the atomic ratio of the aluminum atom to the vanadium atom (Al/V) in the reaction system is normally at least 2, preferably from 2 to 50, in particular from 3 to 20.

POLYMERIZATION

In first process according to the invention, the cycloolefin random copolymer is prepared by copolymerization of ethylene with a cycloolefin represented by the aforementioned general formula [I] in the above-mentioned hydrocarbon solvent in the presence of the catalyst as aforesaid at a temperature of usually from −50° to 100° C. and a pressure of from 0 to 50 kg/cm² G.

The polymerization may be carried out using a polymerization reactor such as a loop-shaped reactor having a function to perform forced circulation of a reaction liquid by means of a pump or a polymerization vessel equipped with a stirrer.

The optimum conditions under which the polymerization is carried out are illustrated below in detail.

In the first process according to the invention, it is desirable that the cycloolefin random copolymers are prepared by copolymerization of ethylene and the above-mentioned cycloolefins under such conditions that substantially no gas phase portion is present in the polymerization reactor even when either of the above-mentioned reactors is used.

By carrying out the above-mentioned polymerization reaction using a reactor in which substantially no vapor phase portion is present, it becomes possible that solvent-insoluble copolymers which are high in the ethylene content and which are insoluble in the hydrocarbon solvent used in carrying out the polymerization reaction are difficult to form in the reactor.

When the cycloolefin random copolymers are prepared using the polymerization vessel equipped with a stirrer, various measures may be adopted in order that substantially no gas phase portion is present in said polymerization vessel. For example, it is desirable to design that a nozzle to pick up the copolymer solution from the polymerization vessel is fitted to the uppermost portion of said polymerization vessel and the gas portion formed, if any, can be discharged promptly from the polymerization vessel. The amount of the resulting cycloolefin random copolymer to be picked up is preferably controlled automatically by means of a pressure control valve and not by means of a liquid surface control valve as used hitherto.

In order to prevent leakage of the cycloolefin random copolymer from a shaft sealing portion of the stirrer, said leakage being caused by permeation of said copolymer into the shaft sealing portion, for example, a sealing surface of a mechanical seal or the like, it is preferable to take a measure, for example, by flowing a flashing liquid over said shaft sealing portion or the like.

When the cycloolefin random copolymers are prepared using the loop-shaped reactor, a so-called cavitation takes place if the gas phase portion in excess of a certain degree is present around a pump for forced circulation of said copolymer solution and consequently the forced circulation of said copolymer solution becomes difficult, and hence, it is possible to confirm whether or not the interior of said reactor is substantially filled with said copolymer solution by observing a flow rate of said copolymer solution within the reactor. The resulting cycloolefin random copolymers are preferably picked up from the reactor, while automatically controlling the pressure inside the reactor by a pressure control valve.

Even in the case where either the above-mentioned polymerization vessel equipped with a stirrer or loop-shaped reactor is used, variations of the pressure in said polymerization reactor which is automatically controlled by means of the pressure control valve become large as the amount of the gas phase portion in the reactor decreases. Then, it is readily confirmed that substantially no gas phase portion is present in the reactor when a large variation in pressure as aforesaid is recorded in a pressure record provided in said reactor.

From the standpoint of material balance, moreover, such a state wherein substantially no gas phase portion is present can also be set by selection of such polymerization temperature and pressure that a product of an amount of the hydrocarbon solvent fed per unit of time to the reactor and a solubility in said hydrocarbon solvent of ethylene becomes larger than the amount of unreacted ethylene per unit time. In actual practice, however, it is preferable to carry out the polymerization reaction while confirming that no substantially the gas phase portion is present in the reactor by checking the variation width of pressure in the reactor or the electric current consumption of the pump in the loop-shaped reactor.

The copolymerization of ethylene and the cycloolefin in the reactor where substantially no gas phase is present, is carried out at a temperature of normally from −50° to 100° C., preferably from −30° to 80° C., more preferably from −20° to 60° C.

The copolymerization of ethylene and the cycloolefin is normally carried out continuously. In this case, the monomers including ethylene, the cycloolefin of the general formula [I] and optionally one or more other copolymerizable monomers; the catalyst components, that is, the soluble vanadium compound and the organoaluminum compound, and the hydrocarbon solvent, are continuously fed to the polymerization system, while the polymerization reaction mixture is continuously drawn out from the polymerization system.

The average residence time of the polymerization mixture in the polymerization system may be normally from 5 minutes to 5 hours, preferably from 10 minutes to 3 hours, although depending upon kinds of the monomers, the concentration of the catalyst and the polymerization temperature. The pressure of the polymerization system is positive and may be normally up to 50 kg/cm², preferably up to 20 kg/cm².

The molar ratio of ethylene to the cycloolefin used in the copolymerization may be from 99/1 to 1/99, preferably from 98/2 to 2/98, more preferably from 90/10 to 10/90.

By the copolymerization described above, there is obtained a solution of the cycloolefin random copolymer in the hydrocarbon solvent.

In the cycloolefin random copolymer obtained by copolymerization of ethylene and cycloolefin, said cycloolefin exhibits a structure as represented by the general formula [II].

General formula [II]

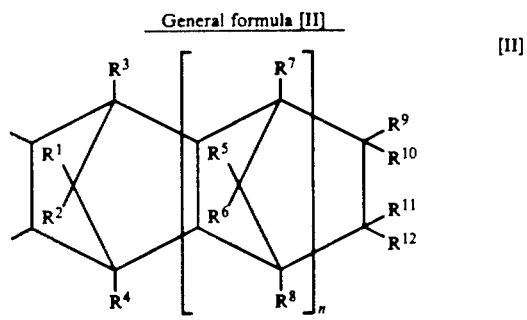

[II]

wherein n and $R^1$ to $R^{12}$ are as defined above.

The cycloolefin random copolymer thus obtained comprises normally from 1 to 99 mol %, preferably from 40 to 85 mol % and more preferably from 50 to 75 mol % of recurring units (a) derived from ethylene and normally from 1 to 99 mol %, preferably from 15 to 60 mol % and more preferably from 25 to 50 mol % of recurring units (b) derived from the cycloolefin. In the cycloolefin random copolymer, the recurring units (a) derived from ethylene and the recurring units (b) derived from the cycloolefin are arranged substantially at random. That this cycloolefin copolymer is substantially linear and has no gel-forming crosslinked structure can be confirmed by the fact that the copolymer completely dissolves in decalin at 135° C.

Such cycloolefin random copolymers as mentioned above usually have an intrinsic viscosity $[\eta]$ of from 0.05 to 10 dl/g as measured at 135° C. in decalin, a softening point (TMA) of from 70° to 250° C. as measured by a thermal mechanical analyzer, a glass transition temperature (Tg) of from 50° to 230° C. and a crystallinity index of from 0 to 10% as measured by X-ray diffractometry.

ASH REMOVAL

The cycloolefin random copolymer solution is subjected, if desired, to ash removal step. In this ash removal step, an alkali solution, for example an aqueous sodium hydroxide solution having a concentration of from 10 to 50% by weight, is added to the cycloolefin random copolymer solution to stop the polymerization reaction, and the catalyst residue which remains in this polymer solution is removed (deashed) therefrom.

Subsequently, the thus deashed polymer solution is transferred, in actual practice, once to a container equipped with a stirrer and stirred for a certain period of time, though said polymer solution may be subjected, immediately after the deashing step, to flash drying step.

HEATING

The cycloolefin random copolymer solution subjected to deashing step in the manner mentioned above is then heated usually by using a heater, for example, a double-pipe heater, plate-type heat exchanger and so on.

In heating the cycloolefin random copolymer solution by using this heater, a concentration of the copolymer in said solution is preferably adjusted usually to from 1 to 70% by weight. The heating temperature employed should be a temperature sufficient to thoroughly volatillize the solvent in the copolymer solution in the subsequent flash drying step, and is usually from 150° to 280° C., preferably from 180° to 250° C.

FLASH DRYING

After completion of the above-mentioned heating step, the cycloolefin random copolymer solution is preferably flash dried, whereby unreacted cycloolefin monomer is removed therefrom. This flash drying step may be carried out, for example, by using a double-pipe flash drier.

In flash drying the cycloolefin random copolymer solution using the double-pipe flash drier, it is preferable to give said solution such a pressure distribution and a quantity of heat that the temperature as preset in the drier becomes a temperature at which no solidification of the copolymer in the cycloolefin random copolymer solution will take place. In that case, it is preferable to feed the cycloolefin random copolymer solution to the drier at a rate of at least 0.3 m/sec or thereabouts in order to inhibit staining of a heat transfer surface of the drier.

By carrying out the flash drying of the cycloolefin random copolymer solution under the above-mentioned conditions, there are obtained cycloolefin random copolymers from which unreacted cycloolefin monomer and the solvent remaining have been substantially removed. The cycloolefin random copolymers thus obtained are excellent in such properties as heat resistance, heat aging property, chemical resistance, solvent resistance, dielectric properties, rigidity and impact property.

As mentioned above, the cycloolefin random copolymers subjected to flash drying step contain practically no unreacted cycloolefin monomer. However, these copolymers which contain, if any, small amounts of unreacted cycloolefin monomer may also be treated with the following extruder, and thereby to remove the unreacted monomer therefrom.

By passing the above-mentioned flash dried cycloolefin random copolymer through a twin-screw extruder equipped with atmospheric and vacuum vents, the unreacted cycloolefin monomer present in such small amounts in said copolymer can be removed therefrom.

The atmospheric vent is necessary for preventing the cycloolefin random copolymer from its foaming in the vacuum vent. The temperature of the extruder should be higher than a boiling point of the unreacted cycloolefin monomer in the atmosphere, and is usually from 210° to 280° C., preferably from 230° to 260° C.

The second process for the production of cycloolefin random copolymers according to the invention will now be described in detail.

In the second process for the production of cycloolefin random copolymers according to the invention, a first solution of a first cycloolefin random copolymer [B] in a first hydrocarbon obtained by copolymerization of ethylene and a cycloolefin of the general formula in said first hydrocarbon in the presence of a catalyst, said first cycloolefin random copolymer [B] having an intrinsic viscosity $[\eta]$ of from 0.05 to 10 dl/g measured in decalin at 135° C. and a softening point (TMA) of at least 70° C., and a second solution of a second random copolymer [C] in a second hydrocarbon obtained by copolymerization of ethylene, at least one α-olefin other than ethylene and a cycloolefin of the general formula [I] in said second hydrocarbon in the presence of a catalyst, said second cycloolefin random copolymer [C] having an intrinsic viscosity $[\eta]$ of from 0.01 to 10 dl/g measured in decalin at 135° C. and a softening point (TMA) of less than 70° C., are mixed to provide a mixed solution in which from 5 to 100 parts by weight of said second cycloolefin random copolymer [C] is present based on 100 parts by weight of said first cycloolefin random copolymer [B] present therein;

and the mixed solution is flash dried.

The first solution of a first cycloolefin random copolymer [B] in a first hydrocarbon is obtained by copolymerization of ethylene and a cycloolefin of the general formula [I] in a hydrocarbon as described herein above with respect to the first process according to the invention in the presence of a catalyst as described herein above with respect to the first process according to the invention normally at a temperature of from −50° to 100° C. under a pressure of above 0 and not higher than 50 kg/cm² G. In the production of the first cycloolefin random copolymer [B], a minor amount of α-olefin having from 3 to 20 carbon atoms may be copolymerized with the ethylene and cycloolefin provided that the resulting copolymer [B] has properties prescribed herein.

The copolymerization may be carried out using either a loop-shaped reactor or a polymerization vessel equipped with a stirrer.

The cycloolefin random copolymer [B] thus obtained comprises from 40 to 85 mol % and preferably from 50 to 75 mol % of recurring units (a) derived from ethylene and from 15 to 60 mol % and preferably from 25 to 50 mol % of recurring units (b) derived from the cycloolefin. In the cycloolefin random copolymer [B], the recurring units (a) derived from ethylene and the recurring units (b) derived from the cycloolefin are arranged substantially linear and at random. That this cycloolefin copolymer [B] is substantially linear and has no gel-forming crosslinked structure can be confirmed by the fact that the copolymer completely dissolves in decalin at 135° C.

The cycloolefin random copolymer [B] has an intrinsic viscosity [$\eta$] of from 0.05 to 10 dl/g, preferably from 0.08 to 5 dl/g as measured at 135° C. in decalin, a softening point (TMA) of at least 70° C., preferably from 90° to 250° C., ad more preferably from 100° to 200° C., as measured by a thermal mechanical analyzer, a glass transition temperature (Tg) of usually from 50° to 230° C., preferably from 70° to 210° C. and a crystallinity index of from 0 to 10%, preferably from 0 to 7%, and more preferably from 0 to 5%, as measured by X-ray diffractometry.

The second solution of a second cycloolefin random copolymer [C] in a second hydrocarbon can be obtained by the same process as described hereinabove with respect to the production of the first solution of the first cycloolefin random copolymer [C] in the first hydrocarbon except that at least one α-olefin other than ethylene is necessarily copolymerized with ethylene and the cycloolefin of the general formula [I] and that conditions are suitably selected so that the resulting second cycloolefin random copolymer may have the properties prescribed herein. Thus, the catalyst, hydrocarbon solvent and apparatus used in the preparation of the second solution can be the same as those used in the preparation of the first solution.

The cycloolefin random copolymer [C] thus obtained comprises from 40 to 98 mol %, preferably from 75 to 98 mol % of recurring units (a) derived from ethylene, from 1 to 40 mol %, preferably from 1 to 15 mol % of recurring units (b) derived from the cycloolefin and from 1 to 45 mol %, preferably from 1 to 35 mol % of recurring units (c) derived from at least one α-olefin other than ethylene. In the cycloolefin random copolymer [C], the recurring units (a) derived from ethylene, the recurring units (b) derived from the cycloolefin and the recurring units derived from at least one α-olefin other than ethylene are arranged substantially linear and at random. That this cycloolefin copolymer [C] is substantially linear and has no gel-forming crosslinked structure can be confirmed by the fact that the copolymer completely dissolves in decalin at 135° C.

The cycloolefin random copolymer [C] has an intrinsic viscosity [$\eta$] of from 0.01 to 10 dl/g, preferably from 0.08 to 5 dl/g as measured at 135° C. in decalin, a softening point (TMA) of less than 70° C., preferably from −40° to 60° C., and more preferably from −30° to 30° C., as measured by a thermal mechanical analyzer which is desirably lower than the softening point of the copolymer [B] by from 30° to 250° C., preferably by from 50° to 250° C., and more preferably by from 200° to 240° C., a glass transition temperature (Tg) of usually from −60° to 40° C., preferably from −50° to 10° C. which is desirably lower than that of the copolymer [B] by from 30° to 250° C., preferably by from 100° to 240° C., and a crystallinity index of from 0 to 10%, preferably from 0 to 7%, and more preferably from 0 to 5%, as measured by X-ray diffractometry.

In the second process according to the invention, the first solution and the second solution are admixed together in such proportions that the resulting mixed solution may contain from 5 to 100 parts, preferably from 7 to 80 parts, and more preferably from 10 to 70 parts by weight of the second cycloolefin random copolymer [C] based on 100 parts by weight of the first cycloolefin random copolymer [B] present therein. With less than 5 parts by weight, based on 100 parts by weight of the copolymer [B], of the copolymer [C], the final product tends not to have satisfactory impact property, although it has excellent rigidity. Whereas with the copolymer [C] in excess of 100 parts by weight based on 100 parts by weight of the copolymer [B], the final product tends to have unsatisfactory rigidity, although the impact property is excellent.

The mixed solution of the first cycloolefin random copolymer [B] and the second cycloolefin random copolymer [C] is then optionally subjected to ash removal and heating steps and thereafter flash dried in the manner as described hereinabove with respect to the first process according to the invention.

In the third process for the production of cycloolefin random copolymers according to the invention, a first solution of a first cycloolefin random copolymer [B] in a first hydrocarbon described hereinabove with respect to the second process according to the invention and a third solution of a third random copolymer [D] in a third hydrocarbon obtained by copolymerization of ethylene, at least one of propylene and butene, and a cycloolefin of the general formula [I] in said third hydrocarbon in the presence of a catalyst, said third cycloolefin random copolymer [C] having an intrinsic viscosity [$\eta$] of from 0.01 to 10 dl/g measured in decalin at 135° C. and a softening point (TMA) of less than 70° C., are mixed to provide a mixed solution in which from 5 to 100 parts by weight of said second cycloolefin random copolymer [D] is present based on 100 parts by weight of said first cycloolefin random copolymer [B] present therein;

and the mixed solution is flash dried.

The third solution of a third cycloolefin random copolymer [D] in a third hydrocarbon can be obtained by the same process as described hereinabove with respect to the production of the second solution of the second cycloolefin random copolymer [C] in the second hydrocarbon except that at least one specific α-olefin, that is propylene and/or butene is copolymerized with the ethylene and cycloolefin to produce the third solution of the third copolymer [D]. Thus, the third hydrocarbon may be the same as the second and first hydrocarbons.

The cycloolefin random copolymer [D] comprises from 40 to 98 mol %, preferably from 75 to 98 mol % of recurring units (a) derived from ethylene, from 1 to 40 mol %, preferably from 1 to 15 mol % of recurring units (b) derived from the cycloolefin and from 1 to 45 mol %, preferably from 1 to 35 mol % of recurring units (c) derived from propylene and/or butene. In the cycloolefin random copolymer [D], the recurring units (a) derived from ethylene, the recurring units (b) derived from the cycloolefin and the recurring units derived from propylene and/or butene are arranged substantially linear and at random. That this cycloolefin copolymer [D] is substantially linear and has no gel-forming crosslinked structure can be confirmed by the fact that the copolymer completely dissolves in decalin at 135° C.

The cycloolefin random copolymer [D] has an intrinsic viscosity [$\eta$] of from 0.01 to 10 dl/g, preferably from 0.08 to 5 dl/g as measured at 135° C. in decalin, a softening point (TMA) of less than 70° C., preferably from $-40°$ to 60° C., and more preferably from $-30°$ to 30° C., as measured by a thermal mechanical analyzer which is desirably lower than the softening point of the copolymer [B] by from 30° to 250° C., preferably by from 50° to 250° C., and more preferably by from 200° to 240° C., a glass transition temperature (Tg) of usually from $-60°$ to 40° C., preferably from $-50°$ to 10° C. which is desirably lower than that of the copolymer [B] by from 30° to 250° C., preferably by from 100° to 240° C., and a crystallinity index of from 0 to 10%, preferably from 0 to 7%, and more preferably from 0 to 5%, as measured by X-ray diffractometry.

In the third process according to the invention, the first solution and the third solution are admixed together in such proportions that the resulting mixed solution may contain from 5 to 100 parts, preferably from 7 to 80 parts, and more preferably from 10 to 70 parts by weight of the third cycloolefin random copolymer [D] based on 100 parts by weight of the first cycloolefin random copolymer [B] present therein. Or otherwise undesirable tendencies appear as is the case with the second process according to the invention.

The mixed solution of the first cycloolefin random copolymer [B] and the third cycloolefin random copolymer [D] is then optionally subjected to ash removal and heating steps and thereafter flash dried in the manner as described hereinabove with respect to the first and second processes according to the invention.

By the first, second and third processes according to the invention in which a solution of cycloolefin random copolymer(s) in a hydrocarbon is flash dried, there can be economically and effectively produced cycloolefin random copolymer(s) of high quality having any unreacted cycloolefin monomer substantially removed with no need of any complicated process steps.

The fourth process for the production of cycloolefin random copolymers according to the invention comprises copolymerization of ethylene with a cycloolefin of the general formula [I] noted in a hydrocarbon in the presence of a catalyst wherein said copolymerization is carried out in a polymerization reactor where a gas phase is not substantially present.

The fourth process for the production of cycloolefin random copolymers according to the invention, in which ethylene is copolymerized with the cycloolefin in a polymerization reactor where a gas phase is not substantially present, ensures a smooth copolymerization of ethylene and the cycloolefin and a continuous and stable running of the apparatus for the production of ethylene-cycloolefin random copolymers, and is productive of ethylene-cycloolefin random copolymers which have a uniform quality and are excellent in heat resistance, heat aging property and various mechanical properties.

The cycloolefin random copolymers produced by the processes according to the invention have excellent properties as mentioned above and are relatively inexpensive, and therefore, they find application in wide industrial fields, including as engineering plastics.

The process for the production of cycloolefin random copolymers according to the invention will now be described in detail below with reference to the following examples, to which the invention is in no way limited.

Properties of cycloolefin random copolymers were determined as follows.

MFR was measured at 260° C. under a load of 2160 g.

Intrinsic viscosity [$\eta$] was measured in decalin at 135° C. using an Atlantic viscometer.

Copolymer composition [mol %] was determined by infrared spectroscopy. From the height of the peak of the absorption band (1026 cm$^{-1}$) based on the cycloolefin component, the content of cycloolefin was determined. The remainder was regarded as the content of ethylene.

Various ash contents [V, Al and Cl] were determined by X-ray diffractometry.

Volatile materials [VM] was determined from the weight change measured at 300° C., 1 Torr, for 1 hour, and expressed in wt. %.

Unreacted cycloolefin content was determined by gas chromatography on a solution of the cycloolefin random copolymer in cyclohexane.

Softening point [TMA] was determined by Penetration test using a thermomechanical analyzer supplied by Du pont with a rate of temperature rise of 5° C./minute.

Molecular-weight distribution [Mw/Mn] was determined by GPC.

EXAMPLE 1

Flash Drying

Catalyst Preparation

VO(OC$_2$H$_5$)Cl was diluted with cyclohexane to prepare a vanadium catalyst of which vanadium concentration was 6.7 mmol/1-cyclohexane. On the other hand, ethyl aluminum sesquichloride (Al(C$_2$H$_5$)$_{1.5}$Cl$_{1.5}$) was diluted with cyclohexane to prepare an organic aluminum catalyst of which aluminum concentration was 107 mmol/1-cyclohexane.

Polymerization

Cycloolefin random copolymer [B] was continuously prepared by carrying out copolymerization reaction between ethylene and tetracyclo[4,4,0,1$^{2.5}$,1$^{7.10}$]-3-dodecene] (sometimes called merely tetracyclododecene hereinafter) which was cycloolefin by using a polymerization reactor equipped with a stirrer (500 mm in inner diameter, 100 liter in reaction capacity). To perform the copolymerization reaction, the vanadium catalyst prepared in the method stated above was fed into the reactor at such a rate that the concentration of vanadium in cyclohexane, which was a polymerization solvent used, might be maintained at 0.6 mmol/l in the reactor. Just before the feeding of the vanadium catalyst to the reactor, the vanadium catalyst was further diluted with cyclohexane to a V concentration of two times that in the polymerization reactor.

The organoaluminum catalyst prepared above was supplied to the reactor at a rate so that the Al/V of 8.0 might be maintained in the reactor. The aforementioned copolymerization reaction was carried out continuously at a temperature of 11° C. and under a pressure of 1.8 kg/cm² G.

Cycloolefin copolymer [C] was produced by executing the co-polymerization reaction by using a loop-shaped reactor (internal tube diameter:4B, external tube diameter 6B, length: 32 m, vertical type), under a pressure of 4 kg/cm² G, with ethylene, tetracyclododecene as cycloolefin, and propylene as α-olefin.

Ash Removal

The solutions of cycloolefin random copolymer [B] and cycloolefin type random copolymer [C] drawn from the respective reactors were sent into a pipe where they were premixed, and boiler water and a 25 wt. % NaOH aqueous solution as a pH modifier were added to the mixed solution, thereby stopping the above polymerization reaction. The so formed catalyst residue was then removed (deashed) from the mixed solution. The mixed solution being rid of its ash was once mixed for an hour in a stirring bath having an effective capacity of 1.0 m³ before it is sent to the subsequent step.

Heating

To a double-tube heater (external tube diameter: 2B, internal tube diameter: ⅜ B, length: 21 m) heated with steam of 20 kg/cm² G as a heating source, the mixed solution of which the copolymer concentration in the mixed solution was set to 5 wt. % was fed at a rate of 150 kg/h, and the mixture was heated to 180° C.

Flash Drying

By using a double-tube flash drier (external tube diameter: 2B, internal tube diameter: ⅜ B, length: 27 m) and a flash hopper (capacity: 200 liter, the mixed solution from the heating step was flash dried to remove most of the unreacted tetracyclododecene removed together with the polymerization solvent. Steam of 25 kg/cm² G was used as a heating source for the double-tube flash drier.

Kneading by Vented Extruder

The copolymer from the above flash drying step was next kneaded by means of a vented extruder. The kneading was executed using a vented extruder (screw diameter 30 φ mm, twin-screw rotating in the same direction, L/D=42, air vent: 1, vacuum vent: 2), at a barrel temperature of 250° C. and a vacuum degree of vent of 5 Torr. Unreacted tetracyclododecene was again removed from the copolymer.

Typical physical properties of the resulting copolymer are shown in Table 2.

EXAMPLE 2

Flash Drying

Example 1 was repeated except that methyltetracyclo[4,4,0,1²·⁵,1⁷·¹⁰]-3-dodecene] (sometimes called merely methyltetracyclododecene hereinafter) was used as the cycloolefin monomer.

Typical physical properties of the resulting copolymer are shown in Table 2.

TABLE 2

| | Example 1 | Example 2 |
|---|---|---|
| Polymer solution | | |
| Polymer B | | |
| Ethylene content (mol %) | 51 | 62 |
| Polymer concentration (wt. %) | 5 | 5 |
| Polymer [η] (d/g) | 0.94 | 0.48 |

TABLE 2-continued

| | Example 1 | Example 2 |
|---|---|---|
| Polymer TMA (°C.) | 170 | 154 |
| Unreacted cycloolefin rate (kg/h) | 1 | 1.2 |
| Feed rate (kg/h) | 105 | 120 |
| Polymer C | | |
| Ethylene content (mol %) | 76 | 69 |
| Propylene content (mol %) | 16 | 21 |
| Polymer concentration (wt. %) | 5 | 5 |
| Polymer [η] (d/g) | 0.98 | 1.44 |
| Polymer TMA (°C.) | −8 | −4 |
| Unreacted cycloolefin rate (kg/h) | 0.05 | 0.3 |
| Feed rate (kg/h) | 45 | 30 |
| Heater outlet temperature (°C.) | 181 | 180 |
| Flash tube outlet temperature (°C.) | 200 | 200 |
| Properties of the product | | |
| Unreacted cycloolefin content at flash tube outlet (wt. %) | 0.7 | 0.77 |
| VM at flash tube outlet (wt. %) | 3.79 | 3.81 |
| Unreacted cycloolefin content at extruder outlet (wt. %) | 0.04 | 0.04 |
| VM at extruder outlet (wt. %) | 0.76 | 0.77 |

EXAMPLE 3

COPOLYMERIZATION IN THE STATE WITHOUT GAS PHASE

By using a loop-shaped reactor (vertical double-tube having 4B of internal tube diameter, 6B of external tube diameter and 32 m of overall length) copolymerization reaction between ethylene and cycloolefin the formula:

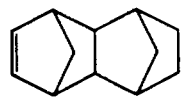

that is, tetracyclo[4,4,0,1²·⁵,1⁷·¹⁰]-3-dodecene] (sometimes called merely tetracyclododecene hereinafter). In this copolymerization, the vanadium catalyst (V-catalyst) prepared described in Example 1 was fed to the reactor at a rate so that the concentration of V-catalyst in cyclohexane, which was a polymerization solvent used, might be maintained at 0.6 mmol/l in the reactor. Just before the feeding of the V-catalyst to the reactor, the V-catalyst was further diluted with cyclohexane to a V concentration of two times that in the reactor.

The organoaluminum catalyst prepared as in Example 1 was supplied to the polymerization vessel at a rate so that the Al/V of 8.0 might be maintained in the polymerization vessel. Cyclohexane which was used as a polymerization solvent was fed into the reactor at a rate of 250 kg/h. Moreover, 4,55 kg/h of ethylene, 5 Nl/h of hydrogen gas as a molecular weight regulator and 10.1 g/h of tetracyclododecene were fed to the reactor. In this reaction, the polymerization temperature was controlled at 10° C. The polymerization temperature was controlled by circulating a 25 wt. % aqueous methanol as a refrigerant through an annular path between the two tubes in the loop-shaped reactor. The rotation speed of the circulating pump was controlled by an invertor so that the flow rate of the aqueous methanol in the path be 5 m/S.

The copolymer solution of ethylene and the cycloolefin obtained under the above conditions was drawn out from the reactor. The copolymer solution was drawn out while controlling the pressure on the intake side of the circulating pump at 4 kg/cm²G by a pressure control valve installed in a pick-up line of the reactor. During the above reaction, variations in pressure was within ±1 kg/cm², and no cavitation occurred around the pump.

Ash Removal

To the solution of the ethylene-tetracyclododecene copolymer drawn out from the reactor were added boiler water and a 25 wt % NaOH solution as a pH modifier, thereby stopping the copolymerization reaction and the catalyst residue so formed (ash) was removed from the copolymer solution.

The copolymer solution being rid of the ash was once stored in a container with a stirrer having the inner diameter of 900 mm and the effective capacity of 1.0 m³ until the subsequent precipitation operation.

Precipitation

The copolymer solution from the ash removal step and a precipitating solvent (acetone, water content of 1.0 wt. %) were fed into a first precipitation drum at rates of 265 kg/h and 1060 kg/h respectively. The first precipitation drum had an inner diameter of 450 mm and an effective capacity of 100 liter, and baffle plates and a stirrer were installed inside. The stirrer provided on the precipitation drum was composed of six turbine blades, and rotated at a speed of 600 rpm during precipitation. The liquid temperature in the precipitation was 30° to 35° C. The dispersion of precipitated copolymer was caused to overflow and fed once into a second precipitation drum with baffles plate and stirrer, 1.3 m of inner diameter and 2.7 m³ of effective capacity, where precipitation of the copolymer was further proceeded. The rotation speed of the stirrer installed in the second precipitation drum in this operation was 200 rpm.

Filtration

To a filtering machine manufactured by Schumacher Japan (model CF-26) comprising 13 ceramic filters, each having an outer diameter of 70 mm, an inner diameter of 50 mm and a length of 1 m, the copolymer dispersion obtained in the second precipitation drum was fed, and filtered therein. The filtrate was sent to a distillation system, where it was fractionated into the unreacted monomer and the solvents, cyclohexane and acetone, and purified respectively, for re-use. Wet cakes of the copolymer of ethylene and cycloolefin containing acetone, which adhered to the outer surface of the ceramic filters of the filtering machine during the above filtration, were dropped into an extraction bath disposed on a lower part of the filtering machine by intermittent back washing with acetone.

That is, acetone was blown out from an acetone holding drum pressurized up to 4 to 5 kg/cm² by nitrogen gas, into the cylindrical ceramic filters at a rate about 200 liter/once, thereby dropping down wet cakes adhering to the outer surface of the cylindrical ceramic filters into the extraction bath. The above back washing was executed at an interval of about 30 minutes.

Extraction

An extraction vessel equipped with baffle plates and a stirrer and having an inner diameter of 1850 mm and an effective capacity of 6 m³ was used as the extraction bath for receiving the wet cakes dropped from the filtering machine and the acetone used for back washing. Using such an extraction vessel, the above falling objects were heated for two hours at a temperature of 78° C. under pressure and stirring so that tetracyclododecene remaining in the wet cakes be extracted in acetone. This extraction was executed by using two extraction vessels A and B, that is, when the dispersion of the wet cakes in acetone was heated and the extraction of unreacted monomer was executed in the extraction vessel A, the polymer wet cakes and acetone dropped from the filtering machine were received in the other vessel B, and to the contrary, when the copolymer dispersion was heated and unreacted monomer was extracted in the extraction vessel B, the wet cakes and acetone falling from the filtering machine were received in the other vessel A. In this way, the extraction vessels A and B were used alternately.

Centrifugal Separation

The copolymer dispersion on which extraction was carried out in the above way was separated into solid and liquid by using a super-decanter produced by Tomoe Kogyo (model P-4400), thereby batching off the wet cakes of the copolymer.

Drying

The copolymer wet cakes processed through the above centrifugal separation was, at first, dried at normal pressure by using an atmospheric drier (produced by Nara Seiki, model NPD-3w-w). During this atmospheric drying, steam at a temperature of 120° C. was passed through a jacket and screw of the atmospheric dryer, and the copolymer wet cakes were thereby heated. The time for drying was determined based on a carrying speed of the wet cakes by means of the screw installed in the atmospheric drier, but it was practically from 20 to 30 minutes.

The copolymer wet cakes dried under normal pressure as stated above was, next, subjected to vacuum drying in a vacuum dryer (made by Tamagawa Machines, 2 m³ of capacity, vacuum stirring drier). During this vacuum drying, steam at a temperature of 140° C. was passed through a jacket and agitating element of the vacuum dryer, and the wet cakes of copolymer were thereby heated. The time for vacuum drying was set at 2.5 hours. The final pressure in the vacuum drying was practically in the range of from 5 to 10 Torr. The copolymer powder obtained by drying wet cakes of copolymer in the above way once stored in a powder silo having a capacity of 2 m³.

Pelletizing

The copolymer powder was melt extruded using a twin-screw extruder (made by The Japan Steel Works, Ltd., TEX-44), and pelletized by means of a hot cut pelletizer. A filter having meshes of 5 μm or 10 μm was mounted between the extruder and the pelletizer for the purpose of removing fine foreign matters in molten polymer.

The above described series of apparatus from the polymerization reactor to the pelletizer were continuously operated for two months to produce a cycloolefin random copolymer. The reactor used in the above operation was disassembled thereafter and inspected, but not a specific grime was detected in the reactor.

The polymerization conditions used and typical properties of the obtained copolymer are shown in Table 3.

EXAMPLE 4

Example 3 was repeated except that the tetracyclododecene was replaced with methyltetracyclododecene of the formula

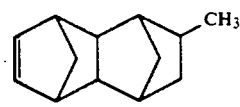

and that the process was continued for 3 weeks under conditions indicated in Table 3. The reactor used in the above operation was disassembled thereafter and inspected, but not a specific grime was detected in the reactor.

The polymerization conditions used and typical properties of the obtained copolymer are shown in Table 3.

COMPARATIVE EXAMPLE 1

Copolymerization in Reactor where a Gas Phase is Present

Example 3 was repeated except that the polymerization was carried out as noted below using a polymerization vessel in which a gas phase is present.

Polymerization

The copolymerization system used comprised a polymerization vessel equipped with stirrer and having an inner diameter of 700 mm, an overall capacity of 560 liter and an available reaction capacity of 280 liter, a vertical shell-and-fin heat exchanger having a heat transfer area of 19.4 m$^2$, a circulating line for drawing out the polymerization liquid from the bottom of the polymerization vessel, circulating the liquid through the heat exchanger and returning the liquid to the polymerization vessel, and a circulating pump installed in the circulating line.

Using such a polymerization system, ethylene was continuously copolymerized with tetracyclododecene.

The vanadium catalyst (V-catalyst) prepared as described in Example 3 was fed to the polymerization vessel at a rate so that the concentration of V in cyclohexane, which was a polymerization solvent used, might be maintained at 0.6 mmol/l in the polymerization vessel. Just before the feeding of the V-catalyst to the polymerization vessel, the V-catalyst was further diluted with cyclohexane to a V concentration of more than two times that in the polymerization vessel in its dilution rate.

The organoaluminum catalyst prepared above was supplied to the polymerization vessel at a rate so that the Al/V of 8.0 might be maintained in the polymerization vessel. Cyclohexane which was used as a polymerization solvent was fed into the reactor at a rate of 200 kg/h. Moreover, 4.55 kg/h of ethylene, 0.2 Nl/h of hydrogen gas as a molecular weight regulator were introduced to the gas phase in the polymerization vessel, and 10.1 g/h of tetracyclododecene was to the liquid phase in the vessel.

Around the jacket installed outside the polymerization vessel and the shell side of the shell-and-fin heat exchanger, 25 wt. % aqueous methanol was circulated as a refrigerant so as to control the polymerization temperature to 10° C. The pressure was controlled by introducing nitrogen gas in the vessel so that the polymerization pressure be 1.0 kg/cm$^2$G.

The copolymerization reaction between ethylene and tetracyclododecene was continuously performed under the above conditions to provide a solution of an ethylene-tetracyclododecene copolymer in cyclohexane.

The solution of the cycloolefin random copolymer so obtained was thereafter processed in the same manner as described in Example 3. Typical properties of the obtained copolymer are shown in Table 3.

After the three-week continuous operation, the current consumption of the circulating pump become unstable. The circulating pump was then opened to find that it was clogged with a copolymer insoluble in cyclohexane. By stopping the above operation and inspecting inside the reactor, a copolymer insoluble in cyclohexane adhering in a belt shape on the inside circumferential surface of the polymerization vessel at a level in the vicinity of the gas-liquid interface in the polymerization vessel was found. As a consequence, the obstruction of the pump was supposed to be the copolymer insoluble in cyclohexane formed on the inside circumferential wall of the polymerization vessel at a level near the gas-liquid interface in the vessel, which dropped down, flowed out from the polymerization vessel and caused clogging of the circulating pump. The composition of the copolymer insoluble in cyclohexane was analyzed to find that the content of ethylene was 90%.

TABLE 3

|  | Example 3 | Example 4 | Comp. Ex. 1 |
|---|---|---|---|
| Polymerization conditions | | | |
| Vanadium concentration [mmol/l] | 0.6 | 0.6 | 0.6 |
| Ratio Al/V [mol/mol] | 8 | 8 | 8 |
| Employed cycloolefin | Tetra-cyclo-dodecene | Methyl-tetra-cyclo-dodecene | Tetra-cyclo-dodecene |
| Feed rate of cycloolefin [kg/h] | 10.1 | 10.5 | 10.1 |
| Feed rate of hydrogen [Nl/h] | 53 |  | 0.2 |
| Feed rate of ethylene [kg/h] | 4.55 | 4.55 | 4.55 |
| Feed rate of CH$_x$ [kg/h] | 250 | 250 | 200 |
| Temperature [°C.] | 10 | 10 | 10 |
| Pressure [kg/cm$^2$ G] | 44 |  | 1 |
| Product | | | |
| Ethylene content [mol %] | 62–65 | 62–65 | 62–65 |
| Remaining V [ppm] | <1 | <1 | <1 |
| Al [ppm] | <5 | <5 | <5 |
| Cl [ppm] | 10–35 | 10–35 | 10–35 |
| MFR [g/10 min.] | 30–35 | 30–35 | 30–35 |
| VM [%] | 0.1–0.3 | 0.1–0.3 | 0.1–0.3 |
| Mw/Mn [—] | 1.8 | 1.9 | 2.0 |
| TMA | 142–148 | 142–146 | 142–148 |

What is claimed is:

1. A process for the production of cycloolefin random copolymers comprising
    pre-heating a cycloolefin random copolymer solution containing a hydrocarbon solvent to a temperature ranging from about 150° to 280° C.,
    flash drying the pre-heated solution using a double pipe flash drier equipped with heat source, and
    passing thus obtained cycloolefin random copolymer through an extruder equipped with vacuum vents,
    said solution being obtained by copolymerization of ethylene and a cycloolefin of the formula [I] noted below in said hydrocarbon solvent in the presence of a catalyst;

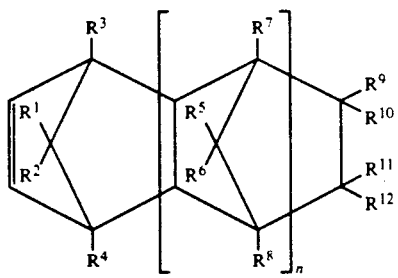
[I]
wherein n is 0 or 1 positive integer, and $R^1$ and $R^{12}$ are the same or different, and each represents a hydrogen or halogen atom or a hydrocarbon group, or $R^9$ (or $R^{10}$) and $R^{11}$ (or $R^{12}$), when taken together, any form a mono- or poly-cyclic ring.
* * * * *